United States Patent [19]
Yang

[11] Patent Number: 5,917,675
[45] Date of Patent: Jun. 29, 1999

[54] CASSETTE LOADING MECHANISM WITH A DEVICE TO OPEN THE DOOR OF A VIDEO CASSETTE RECORDER

[75] Inventor: Chong-Tae Yang, Seoul, Rep. of Korea

[73] Assignee: Daewoo Electronics Co., Ltd., Rep. of Korea

[21] Appl. No.: 08/977,689

[22] Filed: Nov. 24, 1997

[30] Foreign Application Priority Data

Jun. 30, 1997 [KR] Rep. of Korea ...................... 97-29279

[51] Int. Cl.$^6$ .................................................. G11B 5/008
[52] U.S. Cl. .......................................................... 360/96.5
[58] Field of Search ................................ 360/85, 93–96.6

[56] References Cited

U.S. PATENT DOCUMENTS 5,053,901 10/1991 Yamada ................................. 360/96.5
5,706,147 1/1998 Lee ........................................ 360/96.5

FOREIGN PATENT DOCUMENTS 0307917 3/1989 European Pat. Off. .

*Primary Examiner*—A. J. Heinz
*Attorney, Agent, or Firm*—Pennie & Edmonds LLP

[57] ABSTRACT

A cassette loading and unloading device for use in a video cassette recorder ("VCR") comprises a door hinged at the front panel such that it is inwardly swingable, a first and a second side walls, each of which has an upper and a lower guide slots, a cassette holder having at each side surface an upper and a lower slide pins which are respectively fitted in and movable along the upper and the lower guide slots of the side walls, and a first and a second pivot arms tightly fitted on both ends of a shaft rotatably held by the side walls. The first pivot arm has a gear portion at a bottom end. A door opener is rotatably mounted onto the first side wall adjacent to the first pivot arm. The door opener is linked at an upper portion to the door and at a lower portion provided with a cam follower. A lengthwise movable elongate bar has a rack portion engaged with the gear portion of the first pivot arm and a cam provided with a cam surface. Upon an unloading mode of the VCR, the cam follower of the door opener comes into contact with and follows the cam surface so that the door is opened before the pivot arms are rotated.

6 Claims, 11 Drawing Sheets

CASSETTE LOADING MECHANISM WITH A DEVICE TO OPEN THE DOOR OF A VIDEO CASSETTE RECORDER

FIELD OF THE INVENTION

The present invention relates to a video cassette recorder ("VCR"); and, more particularly, to a cassette loading and unloading device for use therein, capable of reducing a distance between a tape cassette and a door, thereby making the size reduction of the VCR possible.

DESCRIPTION OF THE PRIOR ART

There are shown in FIGS. 1 to 5 various views of a conventional cassette loading and unloading device for use in a front loading type VCR. The front loading type VCR normally includes a front panel 11 having an inlet hole 12 through which a tape cassette C is inserted thereinto and ejected therefrom.

The cassette loading and unloading device normally has a door 13 hinged at the front panel 11 to be inwardly swingable only. The door 13 is biased to cover the inlet hole 12 by a torsion spring 14. A pair of side walls 16a, 16b, each of which has an upper and a lower guide slots 6, 7, extends vertically upward from lateral edges of a deck 1. A cassette holder 2 has at each side surface an upper and a lower lug 2a, 2b movable along the upper and the lower guide slots 6, 7 of the side walls 16a, 16b. A pair of pivot arms 17a, 17b are tightly fitted on both ends of a shaft 17 rotatably held by the side walls 16a, 16b and are each provided with a slit 19 in which the lower slide pin 26 of the cassette holder 2 is retained. The right-hand pivot arm 17a has a gear portion 4 engaged with a rack portion 5 of an elongate bar 3 which is moved in the lengthwise direction depending on the activation of a loading motor (not shown). The left-hand pivot arm 17b has a cam 9 at an outer side surface thereof. A door opener 18 is rotatably mounted to the left side wall 16b and is linked at an upper portion to the door 13.

The operation of the conventional cassette loading and unloading device will now be described.

First, upon a loading mode of the VCR, the tape cassette C is inserted into the VCR through the inlet hole 12, and the door 13 is swung inwardly so that the cassette C is received in the cassette holder 2. The pivot arms 17a, 17b are then rotated by the movement of the elongate bar 3 to load the cassette C to a loading completion position (see FIG. 4).

On the other hand, upon an unloading mode of the VCR, the pivot arms 17a, 17b are reversely rotated and, at the same time, the cam 9 of the left-hand pivot arm 17b pushes a lower portion of the door opener 18 so that the door opener 18 is rotated to open the door 13 inwardly (see FIG. 3), thereby preventing the cassette unloaded from being interfered with the door 13.

In such a conventional cassette loading and unloading device, since the door opener is activated by the pivot arm rotating, i.e., the door and the tape cassette are simultaneously moved, the door must be spaced at a certain distance away from the cassette in order to prevent the interference therebetween, which, in turn, makes the size reduction of the VCR difficult.

SUMMARY OF THE INVENTION

It is, therefore, a primary object of the present invention to provide an inventive cassette loading and unloading device for use in a VCR, capable of reducing a distance between a tape cassette and a door, thereby making the size reduction of the VCR possible.

In accordance with one aspect of the present invention, there is provided a video cassette recorder ("VCR") incorporating therein a cassette loading and unloading device and a front panel provided with an inlet hole through which a tape cassette is inserted thereinto and ejected therefrom, the cassette loading and unloading device comprising:

a door hinged at the front panel such that it is inwardly swingable, the door being biased to close the inlet hole by a spring member;

a first and second side walls, each of which has an upper and a lower guide slots;

a cassette holder having at each side surface an upper and a lower slide pins which are respectively fitted in and movable along the upper and the lower guide slots of the side walls;

a first and a second pivot arms tightly fitted on both ends of a shaft rotatably held by the side walls, each of the pivot arms being provided with a slit in which the corresponding lower slide pin of the cassette holder is retained, the first pivot arm having a gear portion at a bottom end;

a door opener rotatably mounted to the first side wall adjacent to the first pivot arm, the door opener being linked at an upper portion to the door and at a lower portion provided with a cam follower; and an elongate bar movable lengthwise, the elongate bar having a rack portion engaged with the gear portion of the first pivot arm and a cam provided with a cam surface, wherein, upon an unloading mode of the VCR, the cam follower of the door opener comes into contact with and follows the cam surface of the cam of the elongate bar so that the door is opened before the pivot arms are rotated.

BRIEF DESCRIPTION OF THE DRAWINGS

The above and other objects and features of the instant invention will become apparent from the following description of preferred embodiments, taken in conjunction with the accompanying drawings, in which.

DETAILED DESCRIPTION OF THE PREFERRED EMBODIMENTS

Figure 1:
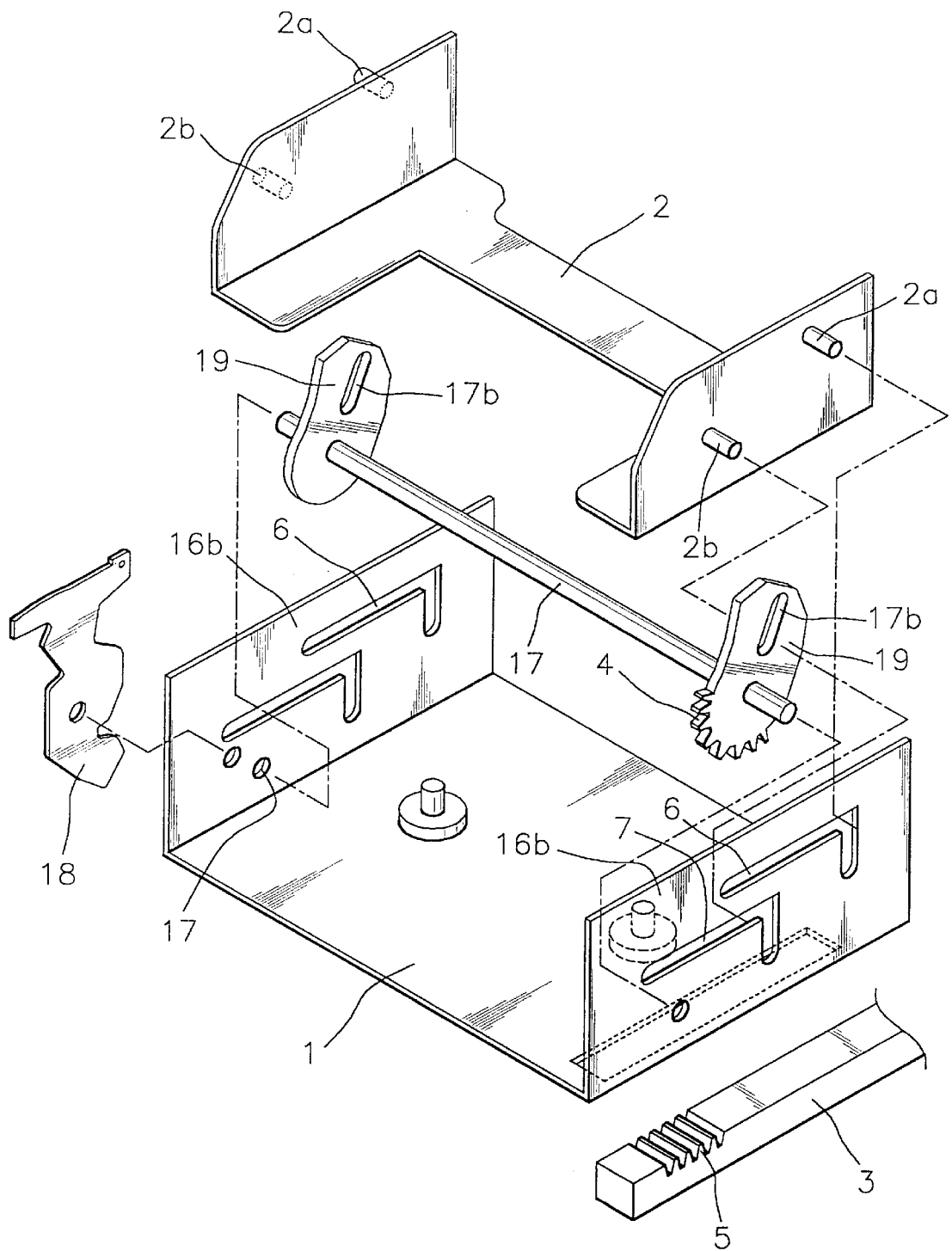
FIG. 1 shows a schematic perspective view of the prior art cassette loading and unloading device.
Figure 2:
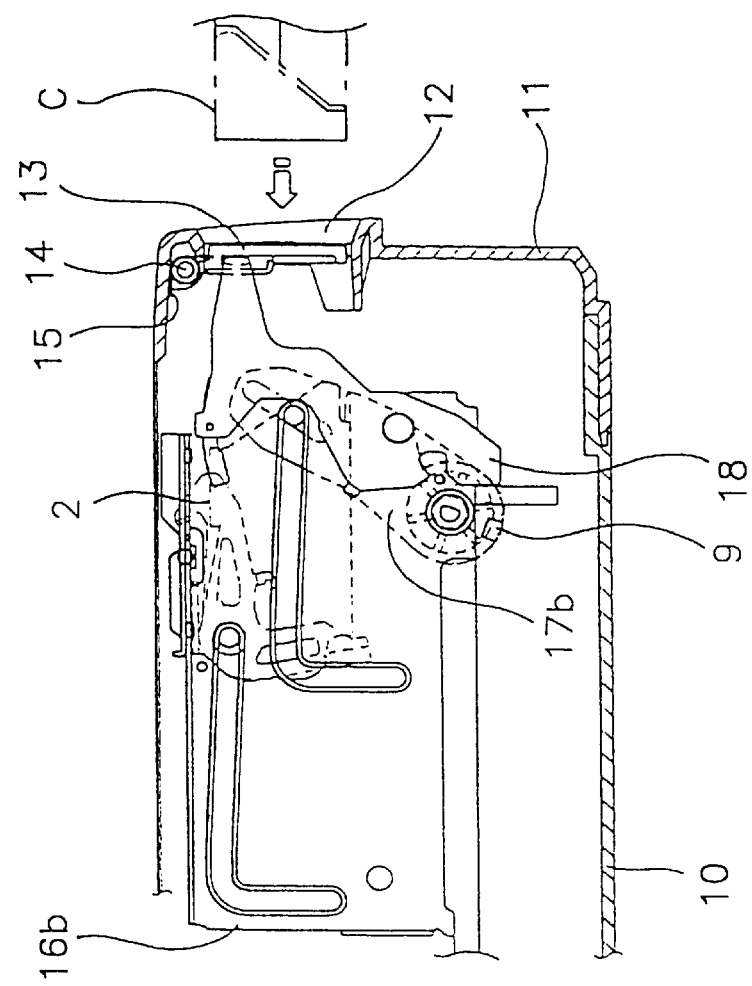
FIGS. 2 to 4 represent left side views of the device in FIG. 1, showing the interaction of the left-hand pivot arm, the door opener and the door.
Figure 3:
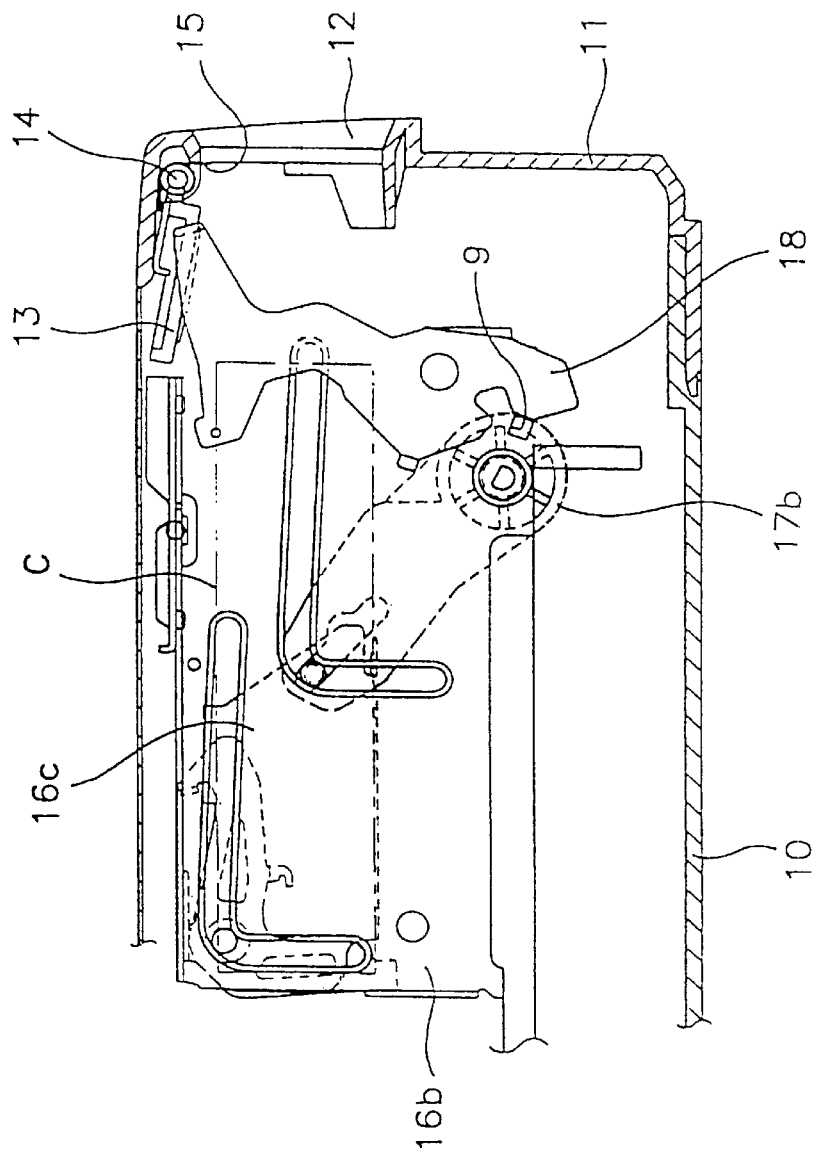
Figure 4:
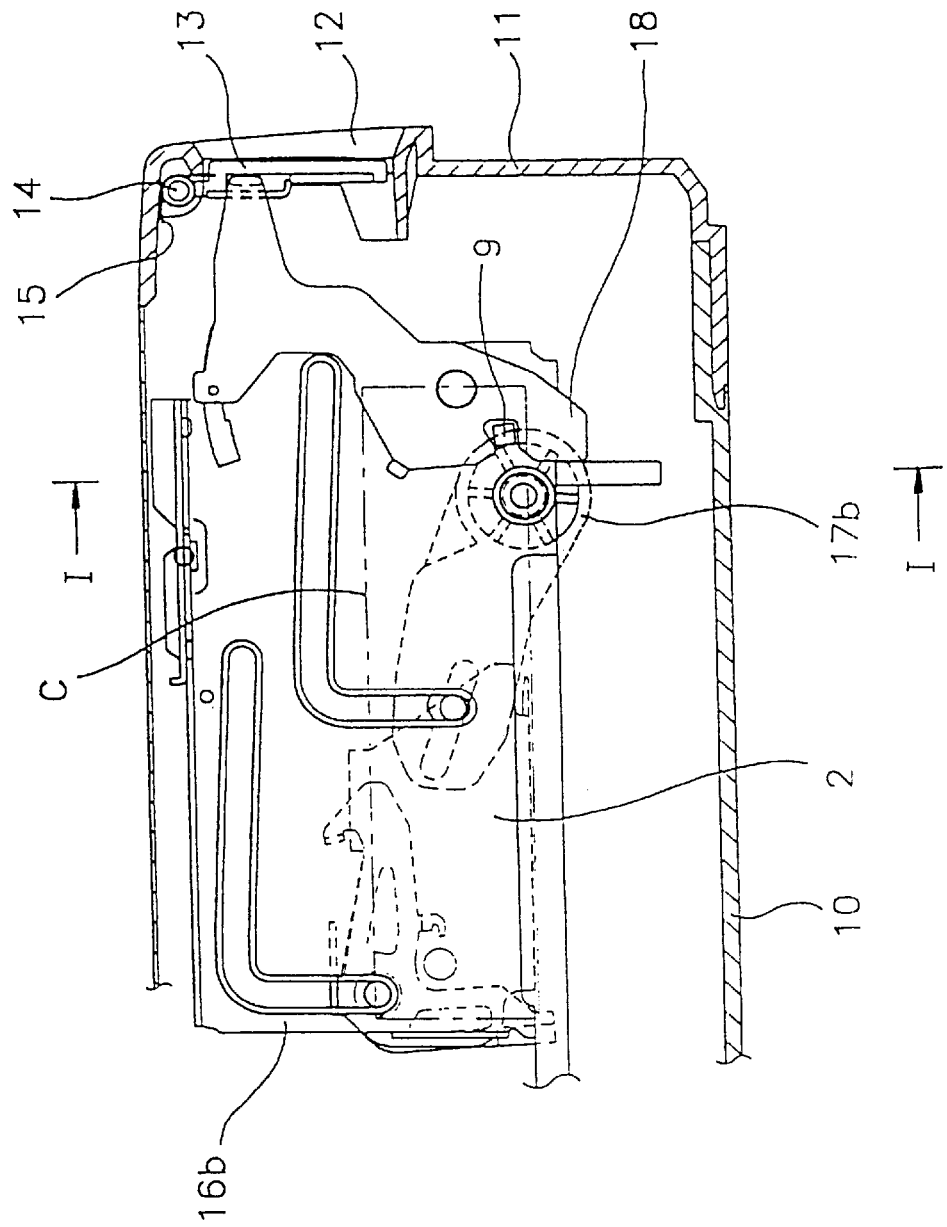
Figure 5:
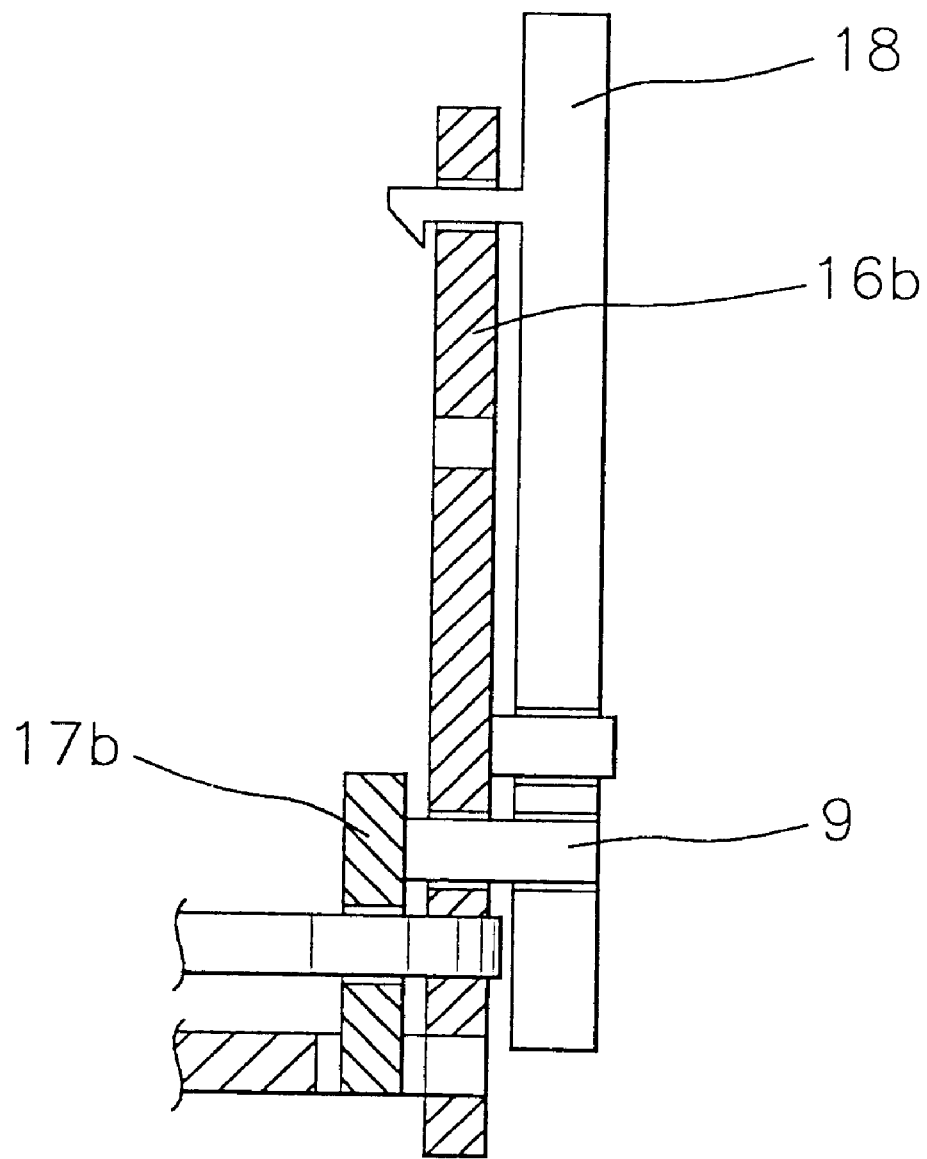
FIG. 5 illustrates a sectional view taken along the line I—I in FIG. 4.
Figure 6:
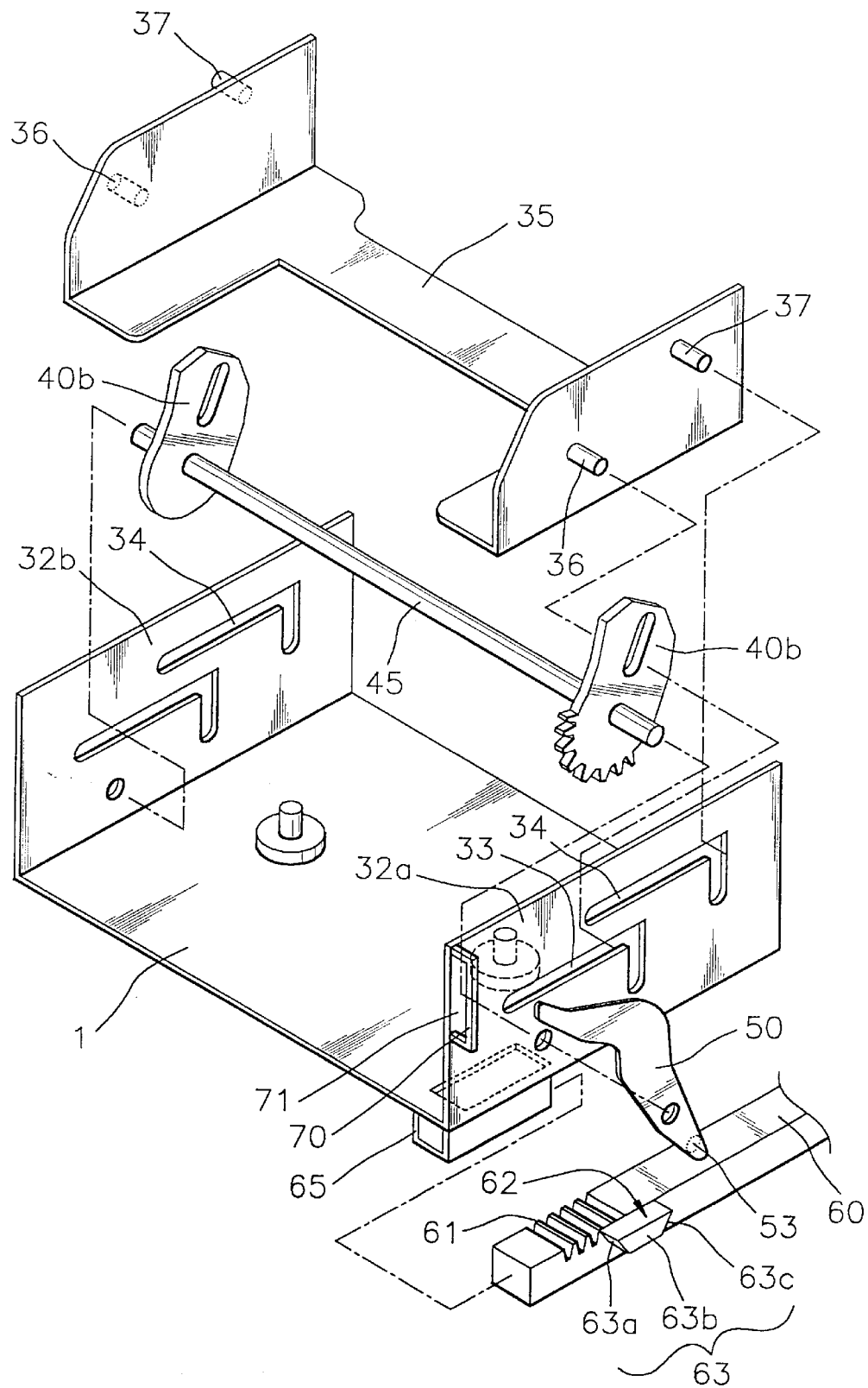
FIG. 6 offers a schematic perspective view of a cassette loading and unloading device in accordance with a preferred embodiment of the present invention.

There are shown in FIGS. 6 to 11 various views of a cassette loading and unloading device, for use in a front, loading type VCR, in accordance with a preferred embodiment of the present invention. The front loading type VCR normally includes a front panel 21 having an inlet hole 22 through which a tape cassette C is inserted thereinto and ejected therefrom.

The cassette loading and unloading device of the present invention comprises a door 23, a first and a second side walls 32a, 32b, a cassette holder 35, a first and a second pivot arms 40a, 40b, a door opener 50, and an elongate bar 61.

The door 23 is hinged at the front panel 21 to be inwardly swingable only, being biased to cover the inlet hole 22 by a spring member 24, e.g., torsion spring.

The side walls 32a, 32b extend vertically upward from lateral edges of a deck 1, respectively. Each of the side walls 32a, 32b has an upper and a lower guide slots 34, 33.

The cassette holder 35 has at each side surface an upper and a lower slide pins 37, 36 which are respectively fitted in and movable along the upper and the lower guide slots 34, 33 of the side walls 32a, 32b.

The first and the second pivot arms 40a, 40b are tightly fitted onto both ends of a shaft 45 rotatably held by the side walls 32a, 32b and are each provided with a slit 43 in which the corresponding lower slide pin 36 of the cassette holder 35 is retained. The first pivot arm 40a has a gear portion 44 at a bottom end. Preferably, the pivot arms 40a, 40b are disposed inside the side walls 32a, 32b.

The door opener 50 is rotatably mounted onto the first side wall 32a adjacent to the first pivot arm 40a. Preferably, the door opener is disposed outside the side wall 32a and is snugly fitted onto the shaft 45. The door opener 50 is linked at an upper portion 52 to the door 23 and at a lower portion provided with a cam follower 53 protruding inwardly. It is preferable that the cam follower 53 be comprised of a roller in order to reduce the friction between the cam follower 53 and a cam surface 63 which will be described in detail hereinafter. A guide member 70 with a hole 71 is disposed at a proximal end of the side wall 32a to guide the rotational movement of the door opener 50 and to prevent the door opener 50 from moving laterally.

The elongate bar 60 is disposed under the first pivot arm 40a and is moved lengthwise depending on the activation of a loading motor (not shown). The elongate bar 60 has a rack portion 61 engaged with the gear portion 44 of the first pivot arm 40a, and a cam 62 formed on the outer side thereof. The cam 62 is provided with a cam surface 63 adapted to push the door opener to rotate so that the door is opened inwardly during an unloading mode of the VCR. The cam surface 63 is divided into three sections 63a to 63c, a first slant section 63a, a second slant section 63c and a flat section 63b. A guide rail 65 is disposed under the deck 1 to slidably support, the elongate bar 60.

The operation of the cassette loading and unloading device of the present invention will now be described.

Figure 7:
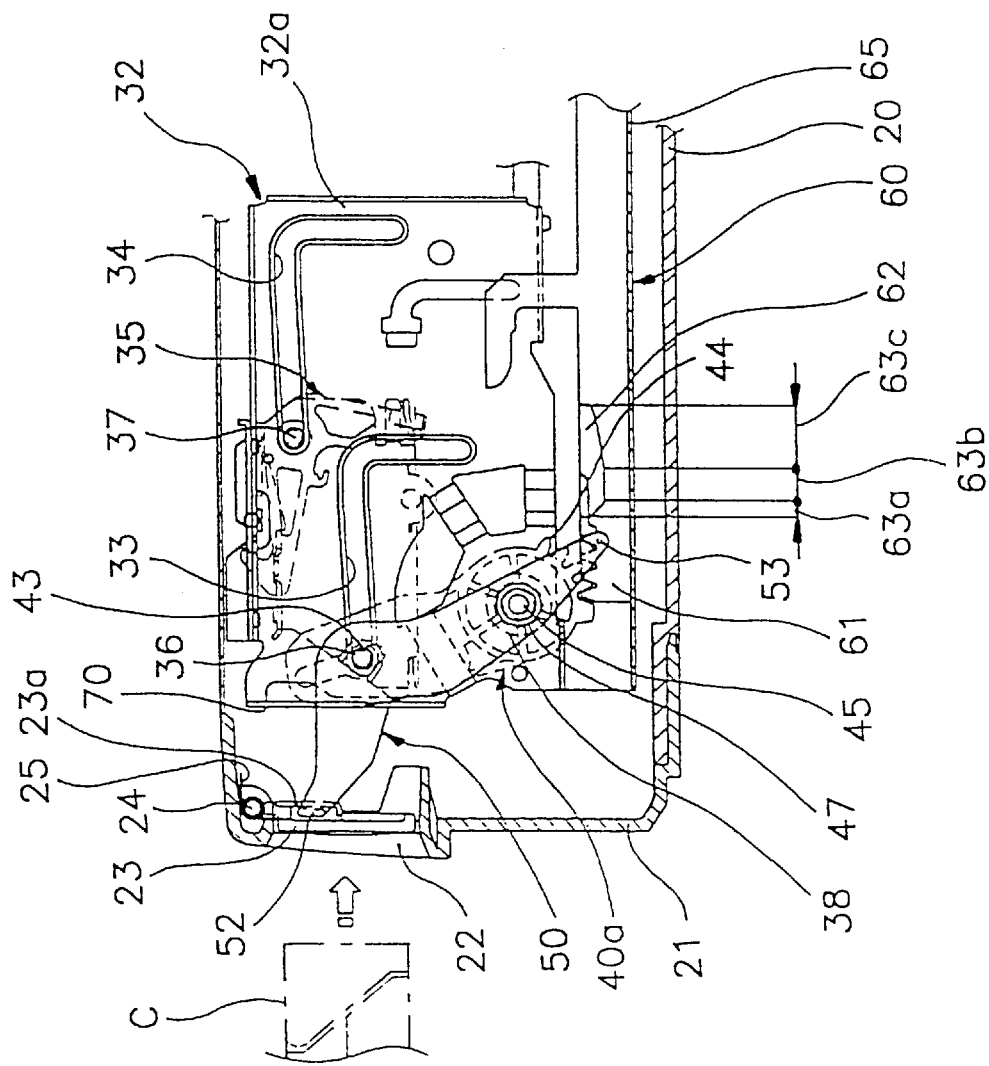
FIGS. 7 to 10 represent right side views of the device in FIG. 6, showing the interaction of the right-hand pivot arm, the door opener, the door and the elongate bar.
Figure 8:
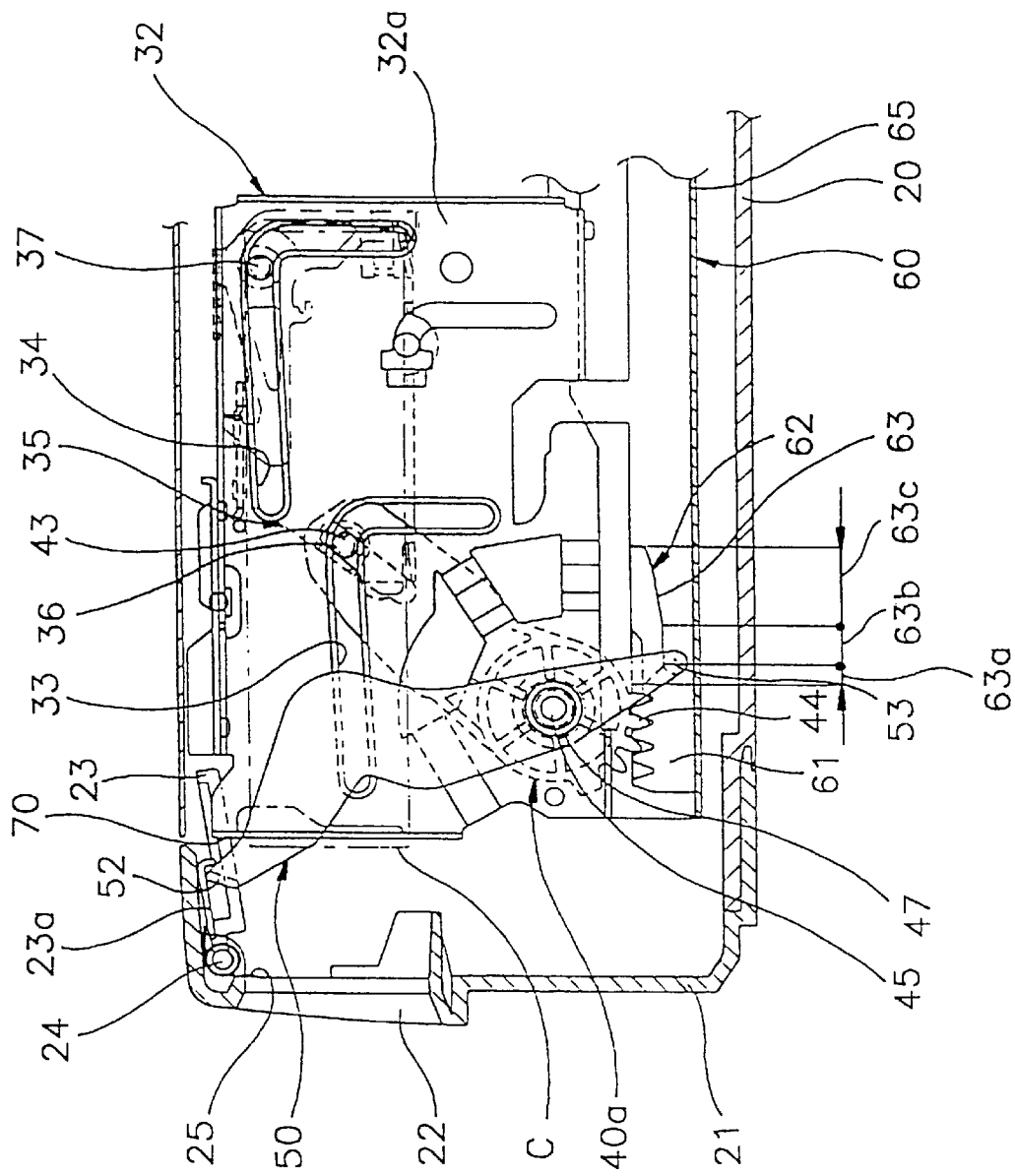
Figure 9:
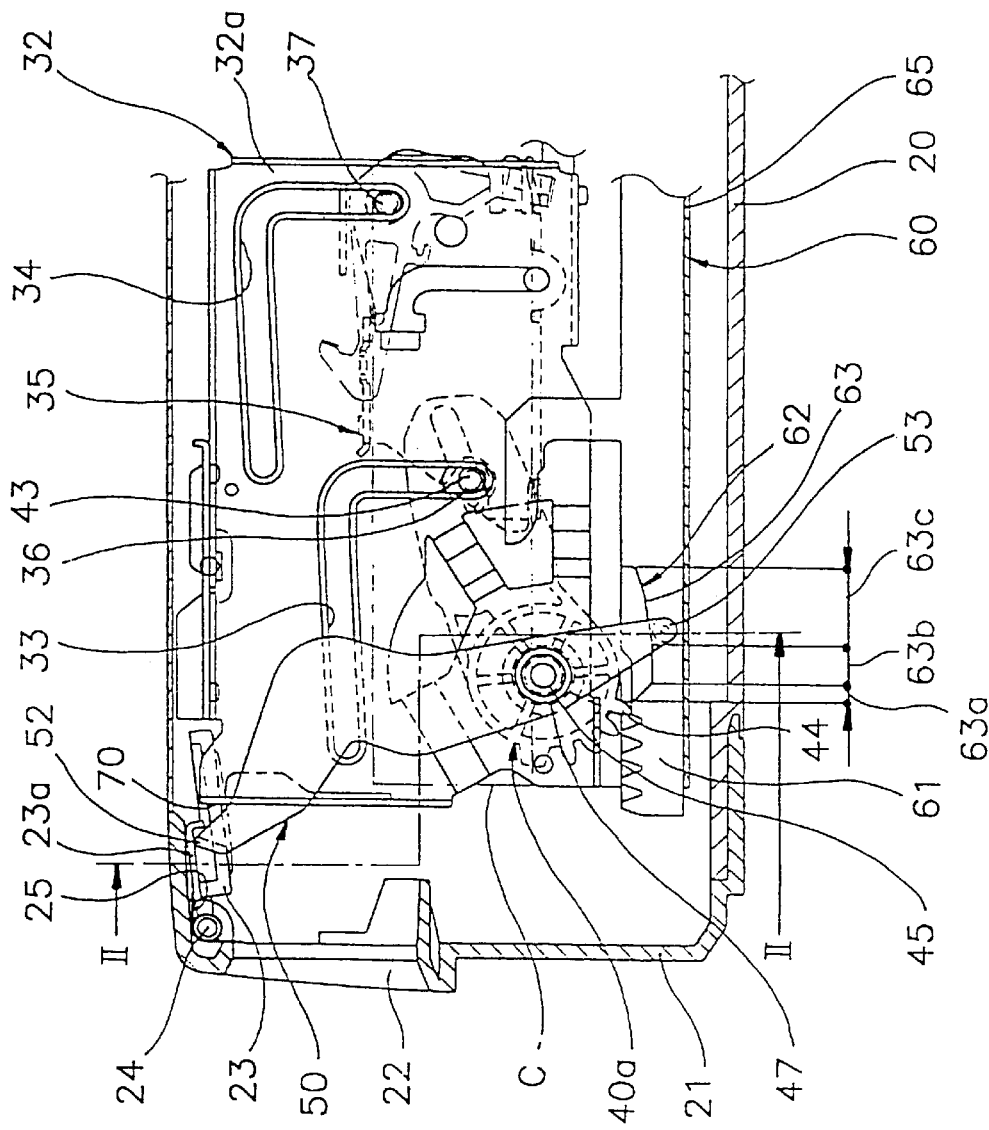
Figure 10:
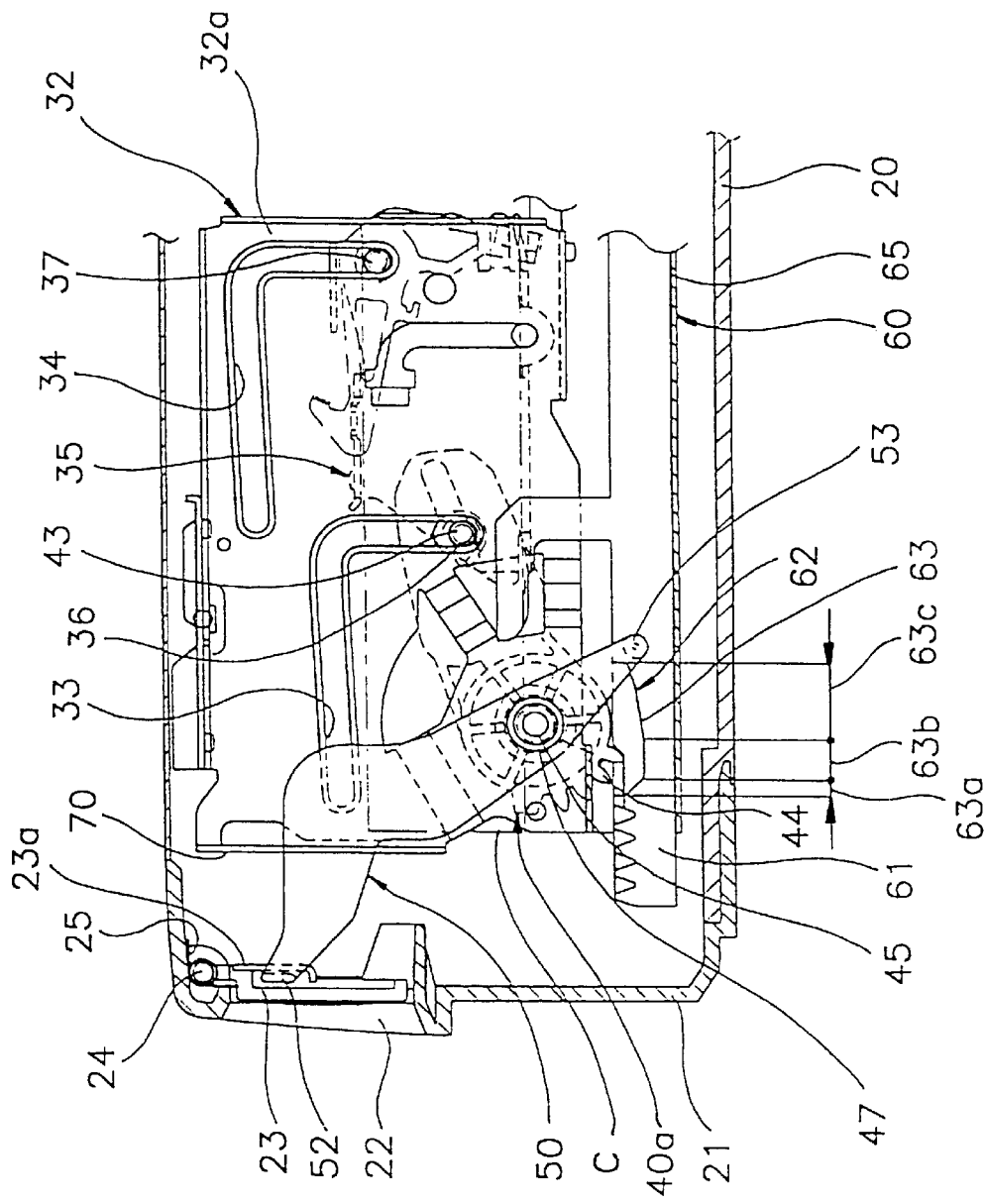
Figure 11:
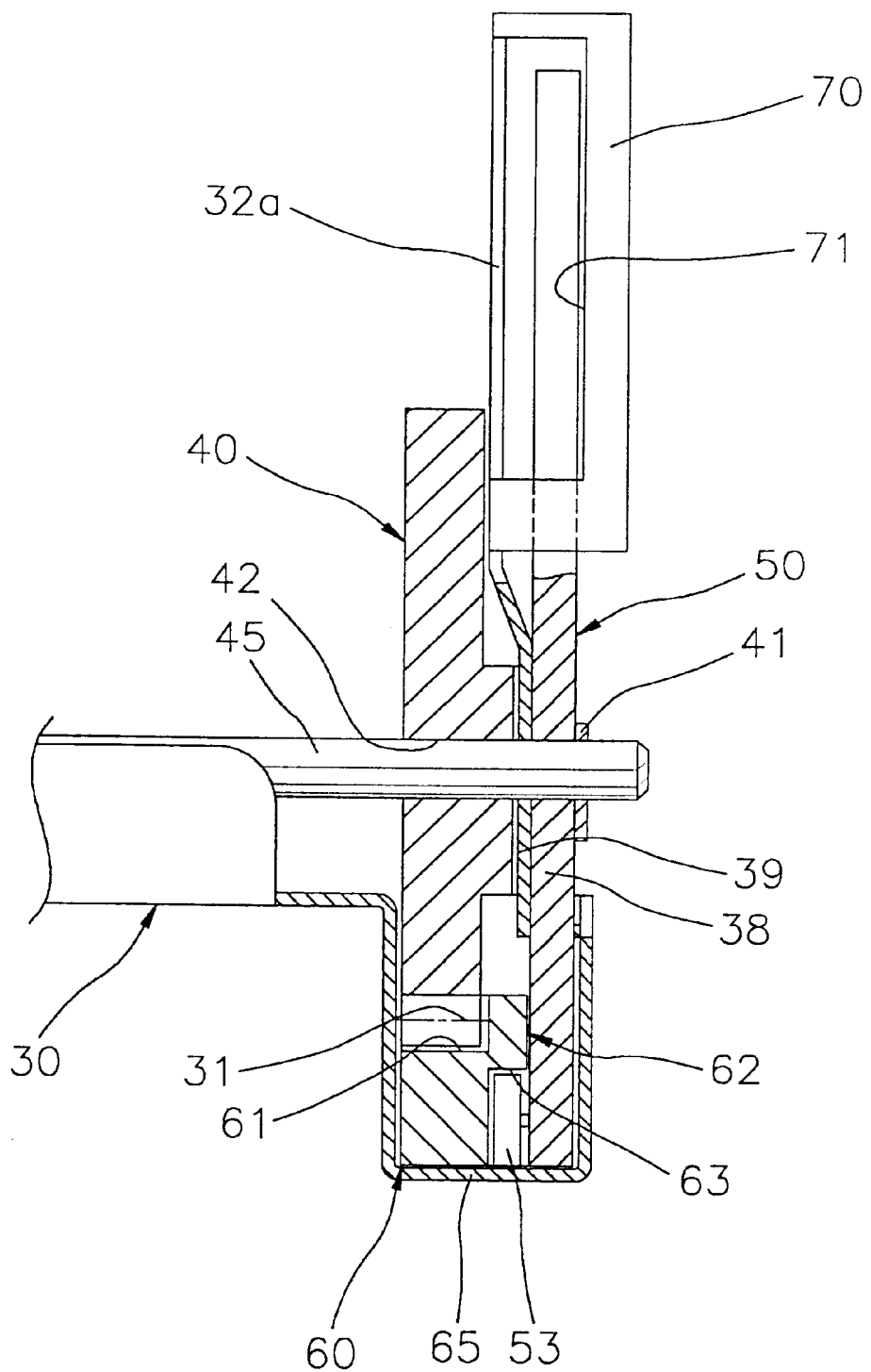
FIG. 11 sets forth a schematic partial front sectional view taken along the line II—II in FIG. 9.

Referring to FIGS. 7 and 8, upon a loading mode of the VCR, the tape cassette C is inserted into the VCR through the inlet hole 22, and the door 23 is swung inwardly so that the cassette C is received in the cassette holder 35. The pivot arms 40a, 40b are then rotated clockwise by the left-hand movement of the elongate bar 60 so that the cassette holder 35 moves horizontally along the guide slots 33, 34. As shown in FIGS. 9 and 10, the cassette C is finally loaded to a loading completion position. At this time, the cam follower 53 of the door opener 50 is located on the right side of the cam 63 of the elongate bar 60.

On the other hand, upon an unloading mode of the VCR, the elongate bar 60 moves in the reverse direction, i.e., in the right direction, and the cam follower 53 of the door opener 50 comes into contact with and follows the cam surface 63 of the elongate bar 60 so that the door opener 50 rotates clockwise to open the door 23 before the tape cassette C moves, i.e., before the pivot arms are rotated (see FIG. 9). More specifically, while the cam follower 53 follows the second slant section 63c of the cam surface 63 of the elongate bar 60, the door 23 is smoothly opened by the rotation of the door opener 50, and at this time the pivot arms 40a, 40b are not moved.

Referring back to FIGS. 8 and 7, while the elongate bar further moves to the right, the cam follower 53 follows the flat section 63b of the cam surface 63. At the time, the pivot arms 40a, 40b are rotated counterclockwise because the gear portion 44 of the first pivot arm 40a is engaged with the rack portion 61 of the elongate bar 60, and the cassette holder 35 is vertically horizontally moved along the guide slot 33, 34, with the door open. The cam follower 53 of the door opener 50 finally deviates from the cam surface 63 so that the door 23 is closed by the biasing force of the spring member 24 when the cassette is taken out from the VCR.

According to the cassette loading and unloading device of the present invention, upon the unloading mode of the VCR, since the door opener is first activated by the movement of the elongate bar before the pivot arms are rotated, i.e., the door 23 has already been opened prior to the movement of the cassette holder 35 and hence the cassette C, the distance between the door and the cassette is reduced, which, in turn, makes the size reduction of the VCR possible.

Although the invention has been shown and described with respect to the preferred embodiments, it will be understood by those skilled in the art that various changes and modifications may be made without departing from the spirit and scope of the invention as defined in the following claims.

What is claimed is:

1. A video cassette recorder ("VCR") incorporating therein a cassette loading and unloading device and a front panel provided with an inlet hole through which a tape cassette is inserted thereinto and ejected therefrom, the cassette loading and unloading device comprising:

a door hinged at the front panel such that it is inwardly swingable, the door being biased to close the inlet hole by a spring member;

a first and a second side walls, each of which has an upper and a lower guide slots;

a cassette holder having at each side surface an upper and a lower slide pins which are respectively fitted in and movable along the upper and the lower guide slots of the side walls;

a first and a second pivot arms tightly fitted on both ends of a shaft rotatably held by the side walls, each of the pivot arms being provided with a slit in which the corresponding lower slide pin of the cassette holder is retained, the first pivot arm having a gear portion at a bottom end;

a door opener rotatably mounted to the first side wall adjacent to the first pivot arm, the door opener being linked at an upper portion to the door and at a lower portion provided with a cam follower; and a lengthwise movable elongate bar having a rack portion engaged with the gear portion of the first pivot arm and a cam provided with a cam surface, wherein, upon an unloading mode of the VCR, the cam follower of the door opener comes into contact with and follows the cam surface of the cam of the elongate bar so that the door is opened before the pivot arms are rotated.

2. The VCR of claim 1, wherein the cam follower of the door opener is comprised of a roller.

3. The VCR of claim 1, wherein the first pivot arm is disposed inside the first side wall and the door opener is disposed outside the first side wall, the door opener being snugly fitted onto the shaft.

4. The VCR of claim 1, wherein the cam surface of the cam of the elongate bar is divided into a first slant section, a second slant section and a flat section therebetween.

5. Tie VCR of claim 1, further comprising a guide rail for slidably supporting the elongate bar, the guide rail being disposed under a deck.

6. The VCR of claim 1, further comprising a guide member for guiding the rotation of the door opener and preventing the door opener from moving in the lateral direction, the guide member being disposed at the first side wall.

* * * * *